United States Patent
Gniadek et al.

(10) Patent No.: US 8,121,456 B2
(45) Date of Patent: Feb. 21, 2012

(54) CABLE PAYOUT SYSTEMS AND METHODS

(75) Inventors: Jeff Gniadek, Northbridge, MA (US);
Erik Gronvall, Richfield, MN (US);
Tom Marcouiller, Burnsville, MN (US);
John Clifton Cobb, III, Fitchburg, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 128 days.

(21) Appl. No.: 12/540,961

(22) Filed: Aug. 13, 2009

(65) Prior Publication Data
US 2010/0034506 A1 Feb. 11, 2010

Related U.S. Application Data

(63) Continuation of application No. 11/502,595, filed on Aug. 9, 2006, now Pat. No. 7,599,598.

(51) Int. Cl.
*G02B 6/00* (2006.01)
(52) U.S. Cl. .................................................. 385/135
(58) Field of Classification Search ........................ None
See application file for complete search history.

(56) References Cited

U.S. PATENT DOCUMENTS

| | | | |
|---|---|---|---|
| 889,109 A | 5/1908 | Davidson | |
| 1,936,227 A | 11/1933 | Cook | |
| 2,047,152 A | 7/1936 | Mitchell | |
| 2,932,465 A | 4/1960 | Johnson | |
| 3,150,769 A | 9/1964 | Cohn | |
| 3,389,868 A | 6/1968 | Majkrzak | |
| 3,680,810 A | 8/1972 | Jarmalow | |
| 3,691,505 A | 9/1972 | Graves | |
| 3,780,964 A * | 12/1973 | Gonzalez | 242/129 |
| 3,823,894 A | 7/1974 | Frederick et al. | |
| 3,845,552 A | 11/1974 | Waltz | |
| 3,870,245 A * | 3/1975 | Witteborg, Jr. | 242/309 |
| 3,879,575 A | 4/1975 | Dobbin et al. | |
| 3,912,854 A | 10/1975 | Thompson et al. | |
| 3,912,855 A | 10/1975 | Thompson et al. | |
| 3,960,313 A | 6/1976 | Sax et al. | |
| 3,982,712 A | 9/1976 | Bassett | |
| 4,085,286 A | 4/1978 | Horsma et al. | |
| 4,107,451 A | 8/1978 | Smith, Jr. et al. | |

(Continued)

FOREIGN PATENT DOCUMENTS

DE 35 37 684 A1 4/1987

(Continued)

OTHER PUBLICATIONS

Exhibit A, "Cable Assemblies: Molding & Termination," http://www.dgo.com/prodcable.htm, 8 pages (Copyright 2001).

(Continued)

*Primary Examiner* — Sung Pak
(74) *Attorney, Agent, or Firm* — Merchant & Gould P.C.

(57) ABSTRACT

A method for deploying a telecommunications cable includes obtaining a payout arrangement including a length of cable, selecting one of the first end and the second end of the length of cable to access; accessing the selected end of the length of cable; and pulling the selected end to unwind the length of cable from the payout arrangement. In some embodiments, the cable is arranged around adjacent spools. In other embodiments, the cable is arranged within a container with access opening on the top and bottom. In still other embodiments, the cable is wound around a spool and at least one spacer.

8 Claims, 9 Drawing Sheets

U.S. PATENT DOCUMENTS

| | | | |
|---|---|---|---|
| 4,152,539 A | 5/1979 | Charlebois et al. | |
| 4,219,274 A * | 8/1980 | Dabby et al. | 356/244 |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Jonathan et al. | |
| 4,475,935 A | 10/1984 | Tanaka et al. | |
| 4,481,380 A | 11/1984 | Wood et al. | |
| 4,490,315 A | 12/1984 | Charlebois et al. | |
| 4,512,628 A | 4/1985 | Anderton | |
| 4,528,150 A | 7/1985 | Charlebois et al. | |
| 4,528,419 A | 7/1985 | Charlebois et al. | |
| 4,549,039 A | 10/1985 | Charlebois et al. | |
| 4,550,220 A | 10/1985 | Kitchens | |
| 4,556,281 A | 12/1985 | Anderton | |
| 4,570,032 A | 2/1986 | Charlebois et al. | |
| 4,581,480 A | 4/1986 | Charlebois | |
| 4,589,939 A | 5/1986 | Mohebban et al. | |
| 4,591,330 A | 5/1986 | Charlebois et al. | |
| 4,592,721 A | 6/1986 | Charlebois et al. | |
| 4,595,256 A | 6/1986 | Guazzo | |
| 4,609,773 A | 9/1986 | Brown et al. | |
| 4,625,073 A | 11/1986 | Breesch et al. | |
| 4,629,597 A | 12/1986 | Charlebois et al. | |
| 4,648,606 A | 3/1987 | Brown et al. | |
| 4,648,919 A | 3/1987 | Diaz et al. | |
| 4,654,474 A | 3/1987 | Charlebois et al. | |
| 4,657,165 A | 4/1987 | Giroux | |
| 4,666,537 A | 5/1987 | Dienes | |
| 4,670,069 A | 6/1987 | Debbaut et al. | |
| 4,670,980 A | 6/1987 | Charlebois et al. | |
| 4,678,866 A | 7/1987 | Charlebois | |
| 4,684,764 A | 8/1987 | Luzzi et al. | |
| 4,687,154 A | 8/1987 | Deweese | |
| 4,701,574 A | 10/1987 | Shimirak et al. | |
| 4,725,035 A | 2/1988 | Charlebois et al. | |
| 4,732,628 A | 3/1988 | Dienes | |
| 4,747,020 A | 5/1988 | Brickley et al. | |
| 4,761,052 A | 8/1988 | Buekers et al. | |
| 4,764,232 A | 8/1988 | Hunter | |
| 4,779,784 A | 10/1988 | Giroux | |
| 4,818,824 A | 4/1989 | Dixit et al. | |
| 4,822,434 A | 4/1989 | Sawaki et al. | |
| 4,840,449 A | 6/1989 | Ghandeharizadeh | |
| 4,844,376 A | 7/1989 | Maraman, Sr. | |
| 4,846,343 A | 7/1989 | Rupert | |
| 4,875,952 A | 10/1989 | Mullin et al. | |
| 4,884,863 A | 12/1989 | Throckmorton | |
| 4,901,939 A * | 2/1990 | Obst et al. | 242/118.4 |
| 4,913,512 A | 4/1990 | Anderton | |
| 4,961,623 A | 10/1990 | Midkiff et al. | |
| 4,963,698 A | 10/1990 | Chang et al. | |
| 5,004,315 A | 4/1991 | Miyazaki | |
| 5,042,901 A | 8/1991 | Merriken et al. | |
| 5,046,811 A | 9/1991 | Jung et al. | |
| 5,054,868 A | 10/1991 | Hoban et al. | |
| 5,066,095 A | 11/1991 | Dekeyser et al. | |
| 5,074,808 A | 12/1991 | Beamenderfer et al. | |
| 5,078,332 A | 1/1992 | Carter | |
| 5,097,529 A | 3/1992 | Cobb et al. | |
| 5,099,088 A | 3/1992 | Usami et al. | |
| 5,109,983 A | 5/1992 | Malone et al. | |
| 5,115,105 A | 5/1992 | Gallusser et al. | |
| 5,121,458 A | 6/1992 | Nilsson et al. | |
| 5,125,060 A | 6/1992 | Edmundson | |
| 5,150,789 A | 9/1992 | Bass | |
| 5,183,217 A | 2/1993 | Holler et al. | |
| 5,185,844 A | 2/1993 | Bensel, III et al. | |
| 5,193,756 A | 3/1993 | Chesler | |
| 5,193,758 A | 3/1993 | Laager et al. | |
| 5,194,692 A | 3/1993 | Gallusser et al. | |
| 5,210,812 A | 5/1993 | Nilsson et al. | |
| 5,217,808 A | 6/1993 | Cobb | |
| 5,222,683 A | 6/1993 | Blackshire | |
| 5,241,611 A | 8/1993 | Gould | |
| 5,245,151 A | 9/1993 | Chamberlain et al. | |
| 5,284,323 A | 2/1994 | Pawkett | |
| 5,335,408 A | 8/1994 | Cobb | |
| 5,347,089 A | 9/1994 | Barrat et al. | |
| 5,353,367 A | 10/1994 | Czosnowski et al. | |
| 5,376,196 A | 12/1994 | Grajewski et al. | |
| 5,378,853 A | 1/1995 | Clouet et al. | |
| 5,394,502 A | 2/1995 | Caron | |
| 5,402,515 A | 3/1995 | Vidacovich et al. | |
| 5,410,105 A | 4/1995 | Tahara et al. | |
| RE34,955 E | 5/1995 | Anton et al. | |
| 5,420,958 A | 5/1995 | Henson et al. | |
| 5,440,665 A | 8/1995 | Ray et al. | |
| 5,442,726 A | 8/1995 | Howard et al. | |
| 5,450,517 A | 9/1995 | Essert | |
| 5,491,766 A | 2/1996 | Huynh et al. | |
| 5,509,202 A | 4/1996 | Abdow | |
| 5,517,592 A | 5/1996 | Grajewski et al. | |
| 5,528,718 A | 6/1996 | Ray et al. | |
| 5,657,413 A | 8/1997 | Ray et al. | |
| 5,666,453 A | 9/1997 | Dannenmann | |
| 5,684,911 A | 11/1997 | Burgett | |
| 5,696,864 A | 12/1997 | Smith et al. | |
| 5,734,776 A | 3/1998 | Puetz | |
| 5,767,448 A | 6/1998 | Dong | |
| 5,778,122 A | 7/1998 | Giebel et al. | |
| 5,823,646 A | 10/1998 | Arizpe et al. | |
| 5,825,963 A | 10/1998 | Burgett | |
| 5,892,870 A | 4/1999 | Fingler et al. | |
| 5,917,648 A | 6/1999 | Harker | |
| 5,945,633 A | 8/1999 | Ott et al. | |
| 5,969,294 A | 10/1999 | Eberle et al. | |
| 5,997,186 A | 12/1999 | Huynh et al. | |
| RE36,592 E | 2/2000 | Giebel et al. | |
| 6,077,108 A | 6/2000 | Lorscheider et al. | |
| 6,104,846 A | 8/2000 | Hodgson et al. | |
| RE37,028 E | 1/2001 | Cooke et al. | |
| 6,181,861 B1 | 1/2001 | Wenski et al. | |
| 6,215,930 B1 | 4/2001 | Estes et al. | |
| 6,255,584 B1 | 7/2001 | Renaud | |
| 6,376,774 B1 | 4/2002 | Oh et al. | |
| 6,407,338 B1 | 6/2002 | Smith | |
| 6,466,725 B2 | 10/2002 | Battey et al. | |
| 6,493,500 B1 | 12/2002 | Oh et al. | |
| 6,539,160 B2 | 3/2003 | Battey et al. | |
| 6,564,943 B2 | 5/2003 | Barton et al. | |
| 6,579,014 B2 | 6/2003 | Melton et al. | |
| 6,619,697 B2 | 9/2003 | Griffioen et al. | |
| 6,621,975 B2 | 9/2003 | Laporte et al. | |
| 6,643,445 B2 * | 11/2003 | Bumgarner et al. | 385/137 |
| 6,648,141 B2 | 11/2003 | Land | |
| 6,648,520 B2 | 11/2003 | McDonald et al. | |
| 6,655,016 B2 | 12/2003 | Renaud | |
| 6,668,127 B1 | 12/2003 | Mahony | |
| 6,682,010 B2 | 1/2004 | Pohl | |
| 6,706,968 B2 | 3/2004 | Yaworski et al. | |
| 6,764,220 B2 | 7/2004 | Griffiths et al. | |
| 6,810,194 B2 | 10/2004 | Griffiths et al. | |
| 6,819,842 B1 | 11/2004 | Vogel et al. | |
| 6,856,748 B1 | 2/2005 | Elkins, II et al. | |
| 6,880,219 B2 | 4/2005 | Griffioen et al. | |
| 7,000,863 B2 | 2/2006 | Bethea et al. | |
| 7,006,739 B2 | 2/2006 | Elkins, II et al. | |
| 7,016,592 B2 | 3/2006 | Elkins, II et al. | |
| 7,072,560 B1 | 7/2006 | Bramson | |
| 7,079,745 B1 | 7/2006 | Weinert et al. | |
| 7,198,152 B2 | 4/2007 | Barton et al. | |
| 2004/0074852 A1 | 4/2004 | Knudsen et al. | |
| 2004/0228589 A1 | 11/2004 | Melton et al. | |
| 2004/0247265 A1 | 12/2004 | Takano et al. | |
| 2005/0053342 A1 | 3/2005 | Melton et al. | |
| 2005/0069275 A1 | 3/2005 | Brants et al. | |
| 2005/0111799 A1 | 5/2005 | Cooke et al. | |
| 2005/0111800 A1 | 5/2005 | Cooke et al. | |
| 2005/0175308 A1 | 8/2005 | Elkins, II et al. | |
| 2005/0259928 A1 | 11/2005 | Elkins, II et al. | |
| 2005/0259929 A1 | 11/2005 | Elkins, II et al. | |
| 2005/0259930 A1 | 11/2005 | Elkins, II et al. | |
| 2005/0276552 A1 | 12/2005 | Cooke et al. | |
| 2006/0056782 A1 | 3/2006 | Elkins, II et al. | |

FOREIGN PATENT DOCUMENTS

| | | |
|---|---|---|
| EP | 0 115 725 A1 | 8/1984 |
| EP | 0 860 920 A1 | 8/1998 |
| EP | 1 361 465 A1 | 11/2003 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 5-224027 | 9/1993 |
| JP | 2001-116968 | 4/2001 |
| JP | 2003-329851 | 11/2003 |
| JP | 2003-337230 | 11/2003 |
| WO | WO 2005/119322 A1 | 12/2005 |
| WO | WO 2006/044080 A1 | 4/2006 |
| WO | WO 2006/078007 A1 | 7/2006 |

OTHER PUBLICATIONS

Exhibit B, "DAM/BLOK™ Electrical Splice Kit," http://www.pmiind.com/products/damblok.html, 2 pages (Copyright 2000).

Exhibit C, "Factory Installed Termination System for Fiber Optic Cable Splices," 1 page (admitted as prior art as of Aug. 9, 2006).

Exhibit D, "Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).

Exhibit E, "Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

International Search Report and Written Opinion mailed Feb. 6, 2008.

Invitation to Pay Additional Fees with International Search Report mailed Dec. 6, 2007.

Declaration of Randy Reagan; 2 pages; signed Sep. 11, 2008.

English translation of JP 2003-329851 published Nov. 19, 2003, which was previously submitted in the IDS filed Jan. 7, 2008 (26 pages).

English translation of PCT/JP2006/300929 published (19 pages).

* cited by examiner

CABLE PAYOUT SYSTEMS AND METHODS

CROSS REFERENCE TO RELATED APPLICATION

This application is a continuation of application Ser. No. 11/502,595, filed Aug. 9, 2006, now U.S. Pat. No. 7,599,598, which application is incorporated herein by reference in its entirety.

TECHNICAL FIELD

The principles disclosed herein relate to cable systems. More particularly, the present disclosure relates to storage and deployment of cables.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 110 that connects a number of end subscribers 115 (also called end users 115 herein) in a network. The central office 110 can additionally connect to a larger network such as the Internet (not shown) and a public switched telephone network (PSTN). The network 100 can also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits.

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations can include fewer or more fibers. The portion of network 100 that includes an FDH 130 and a number of end users 115 can be referred to as an F2 portion of network 100. The network 100 includes a plurality of break-out locations 125 at which branch cables are separated out from main cable lines. Branch cables are often connected to drop terminals 104 that include connector interfaces for facilitating coupling the fibers of the branch cables to a plurality of different subscriber locations.

Deployment, otherwise known as payout, of telecommunications cable lines can be performed in a variety of ways. One prior method includes winding the telecommunications cable around a cylindrical spool, placing a rod through the center of the spool, transporting the spool to a deployment site, and unwinding the telecommunications cable by pulling the cable end located on the outside of the spool. Typically, the inside (radially inward) end of the wound cable is fixed in relation to spool rotation and cannot be accessed until the cable has been unwound.

One disadvantage to such a method is that only one end of the telecommunications cable is accessible when the spool is wound. In some cases, the cables are connectorized at one end and unconnectorized at the opposite end. For example, with reference to fiber optic cables, the connectorized end is useful for optically coupling the fibers of the cable to other connectorized fibers and the unconnectorized end is useful for splicing the fibers of the cable to another cable, such as a stub cable. Using the method described above, a technician cannot choose which end of the cable would be most beneficial to access first.

There exists a need in the art for better telecommunications cable storage and deployment systems and methods.

SUMMARY

Certain aspects of the disclosure relate to the storage and deployment of telecommunications cables.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
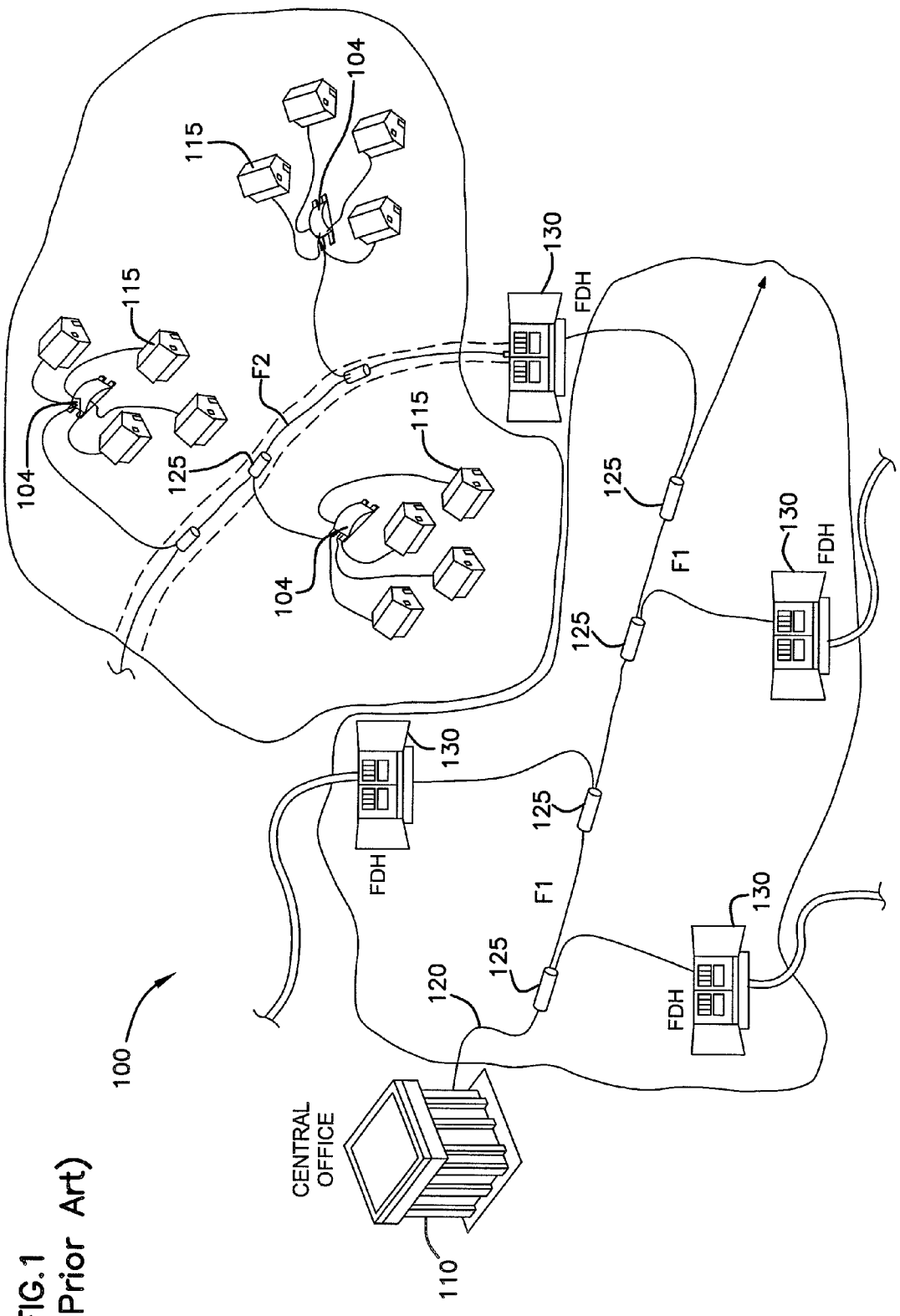
FIG. 1 shows a prior art passive fiber optic network.

Aspects of the present disclosure relate to the storage and deployment of telecommunications cables, such as fiber optic cables and copper cables. Referring to the figures in general, a telecommunications cable 210 extends from a first end 212 to a second end 214. The cable 210 can range in length from about 300 feet to about 3000 feet or more. The payout arrangements disclosed herein enable either end 212, 214 of the telecommunications cable 210 to be accessed at the option of the user.

In some embodiments, one end 212, 214 of the cable 210 can be terminated at a connector, such as a fiber optic connector, or at telecommunications equipment, such as a drop terminal. Details regarding an example drop terminal can be found in copending application Ser. No. 11/075,847, filed Mar. 8, 2005, and titled "FIBER ACCESS TERMINAL," the disclosure of which is hereby incorporated by reference. The opposite end 212, 214 can be connectorized or unconnectorized. In other embodiments, either both ends can be connectorized or both ends can be unconnectorized.

Referring to FIGS. 2-8, a length of telecommunications cable 210 (FIG. 3) can be arranged on a first payout arrangement 300 (FIG. 2) to enable access to both a first end 212 (FIG. 3) and a second end 214 (FIG. 3) of the cable 210. In certain embodiments, about half of the cable 210 is wrapped around a first spool 320 and the other half of the cable 210 is wrapped around a second spool 330 of the payout arrangement 300 (e.g., see FIG. 4). In such embodiments, each end 212, 214 of the cable 210 is accessible from a separate spool 320, 330.

Figure 2:
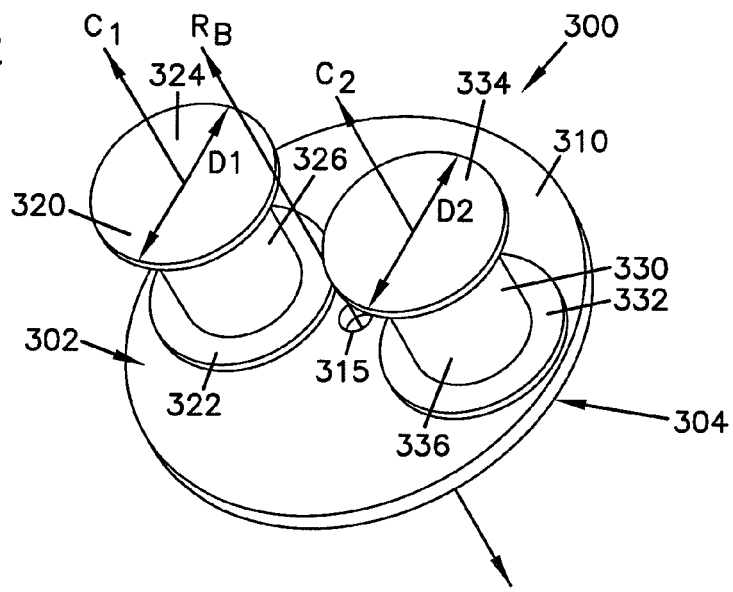
FIG. 2 is a perspective view of an example first payout arrangement having features that are examples of inventive aspects in accordance with the principles of the present disclosure.

FIG. 2 illustrates the example payout arrangement 300 including a base 310 having a front surface 302 and a back surface 304. In the example shown, the base 310 is circular. In other embodiments, however, the base 310 can be any desired shape. In general, the base 310 is configured to enable the payout arrangement 300 to mount for transport from a factory to a deployment site.

In certain embodiments, the base 310 defines a through opening 315 configured to receive a rod (not shown) to enable the base 310 to rotate about an axis RB. Typically, the through opening 315 is located in the center of the base 310. In other embodiments, however, the base 310 is not configured to rotate. In such embodiments, the back surface 304 of the base 310 can be laid on a surface during deployment. In one such embodiment, the base 310 can be anchored to a surface by a fastener inserted through the opening 315.

A first spool member 320 and a second spool member 330 are rotatably mounted on the front surface 302 of the base 310. In certain embodiments, the spools 320, 330 are mounted on opposite sides of the opening 315. Each spool member 320, 330 is configured to rotate about a central axis $C_1$, $C_2$, respectively. In the example shown, the spool members 320, 330 are generally cylindrical. However, spool members of different shapes can also be used.

In certain embodiments, each spool member 320, 330 includes a middle portion 326, 336, respectively, extending between a first end portion 322, 332, respectively, and a second end portion 324, 334, respectively. In other embodiments, however, the middle portions 326, 336 may extend directly from the base 310. Generally, the middle sections 326, 336 have diameters D1, D2, respectively, ranging from about 1.5 feet to about 6 feet. The second ends 324, 334 are generally sized to retain the telecommunications cable 210 wound onto the middle portions 326, 336.

Figure 3:
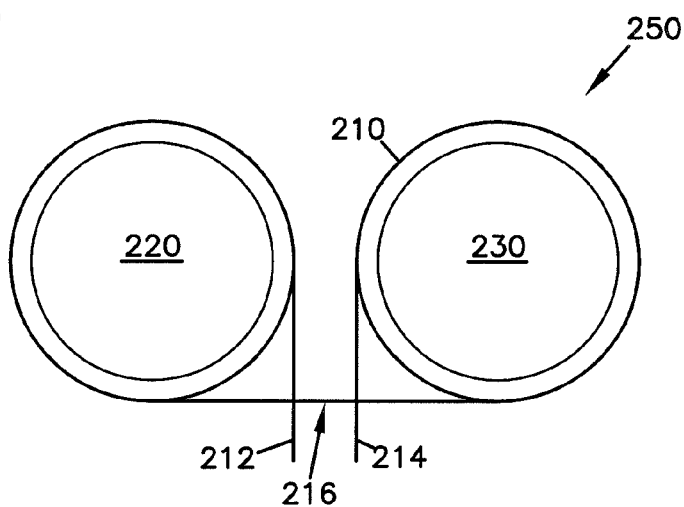
FIG. 3 is a schematic diagram of a length of telecommunications cable arranged in a first cable arrangement on the payout arrangement of FIG. 2.
Figure 4:
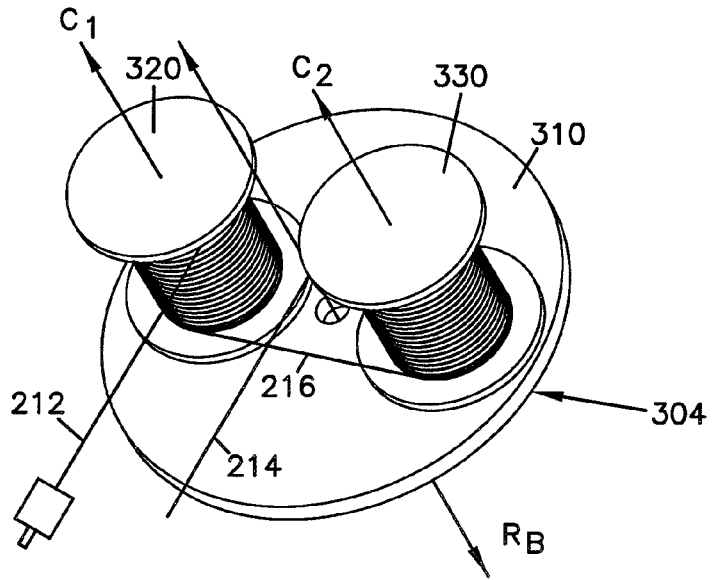
FIG. 4 is a perspective view of a length of telecommunications cable wrapped in the first cable arrangement on the first payout arrangement of FIG. 2.
Figure 5:
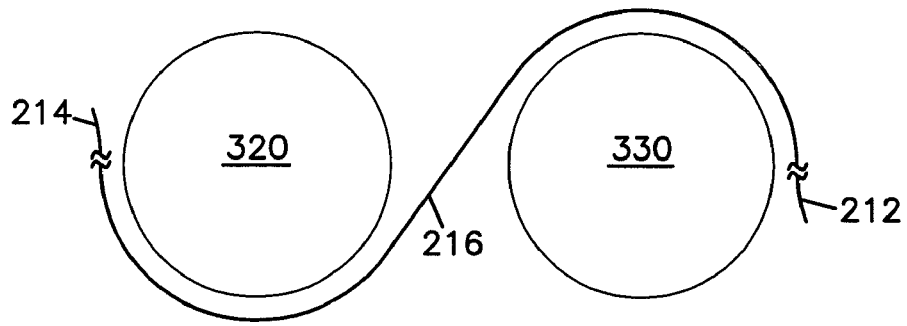
FIGS. 5-7 are schematic diagrams illustrating how to wind a length of telecommunications cable in a second cable arrangement on the payout arrangement of FIG. 2.
Figure 6:
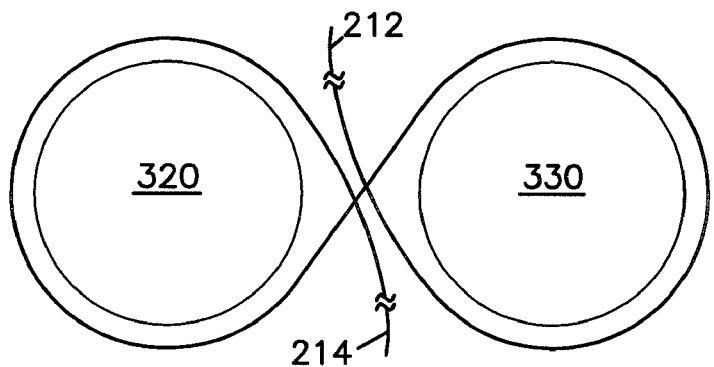
Figure 7:
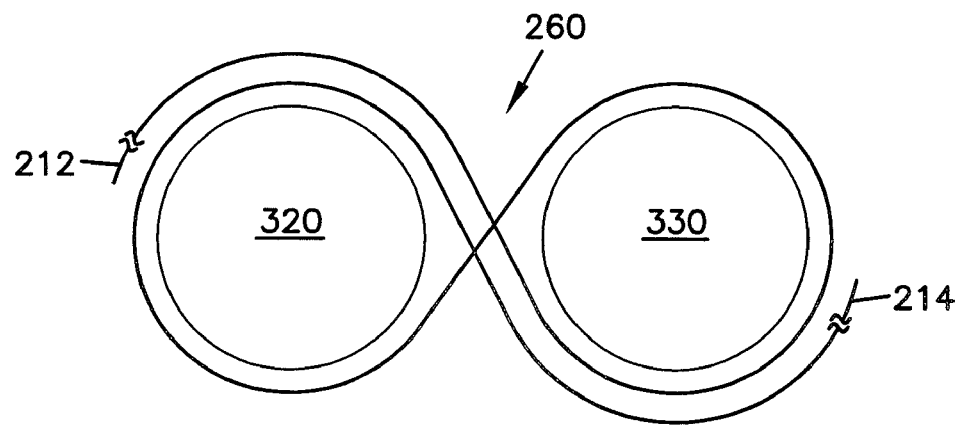

FIGS. 3-4 illustrate one cable arrangement 250 in which the cable 210 can be wrapped around the first spool member 320 and the second member 330. An intermediate section 216 of the cable 210 extends straight between the first and second members 220, 230 (e.g., see FIG. 3) and the first and second ends 212, 214 are wrapped around the first and second spool members 320, 330, respectively (e.g., see FIG. 4). Such a configuration resembles the winding pattern of tape on a cassette deck. One end 212, 214 of the cable 210 is accessible from each spool 320, 330.

FIGS. 5-8 illustrate another cable arrangement 260 in which the cable 210 can be wrapped around the first spool member 320 and the second member 330 of the first payout arrangement 300. The intermediate section 216 of the cable 210 wraps around the first and second members 220, 230 once in a "figure 8" pattern (e.g., see FIGS. 5-7) and the first and second ends 212, 214 are then coiled around the first and second members 320, 330, respectively to take up the remaining cable 210 (e.g., see FIG. 8). One end 212, 214 of the cable 210 is accessible from each spool 320, 330.

In use, a user grasps one of the ends 212, 214 of the cable 210 and pulls in a direction away from the payout arrangement 300 to deploy the cable 220 at an installation site. Because both ends 212, 214 are accessible to the user (i.e., one end 212, 214 extends from each spool 320, 330), the user can choose which end 212, 214 to pull based on where and how the cable 210 is being installed. In either cable arrangement 250 or cable arrangement 260, pulling on one of the ends 212, 214 entrains the spools 320, 330 to spin, enabling the length of telecommunications cable 210 to unwind from the payout arrangement 300.

When a sufficient amount of cable 210 has been unwound, the cable 210 can be connected (e.g., optically, electrically, etc.) to a telecommunications network (e.g., see FIG. 1). In one embodiment, a fiber optic cable 210 can be spliced to another fiber optic cable (not shown). In another embodiment, one end of a copper cable 210 can be electrically coupled to another copper cable (not shown). In other embodiments, the cable 210 is optically coupled to telecommunications equipment.

Figure 9:
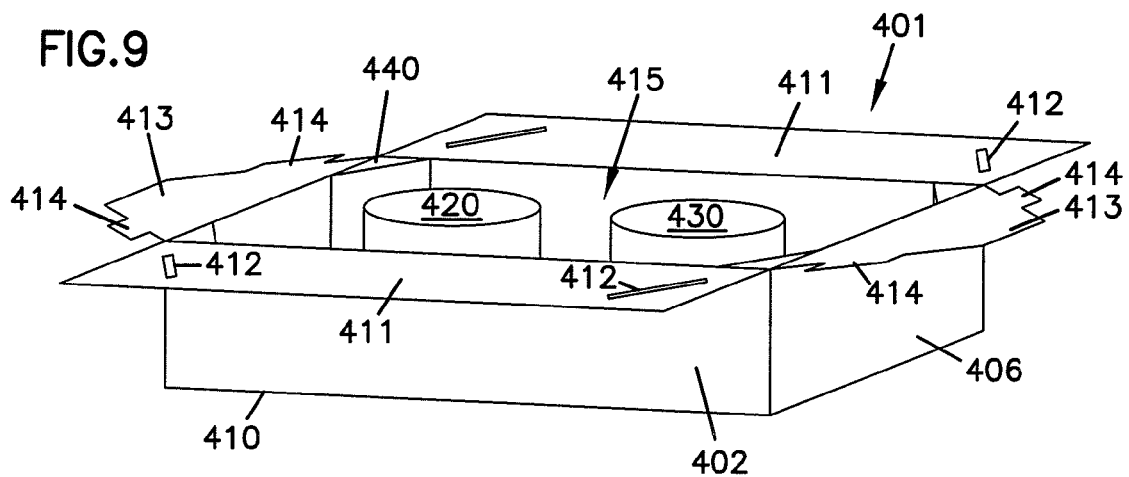
FIG. 9 is a front perspective view of a second payout arrangement having features that are examples of inventive aspects in accordance with the principles of the present disclosure.
Figure 10:
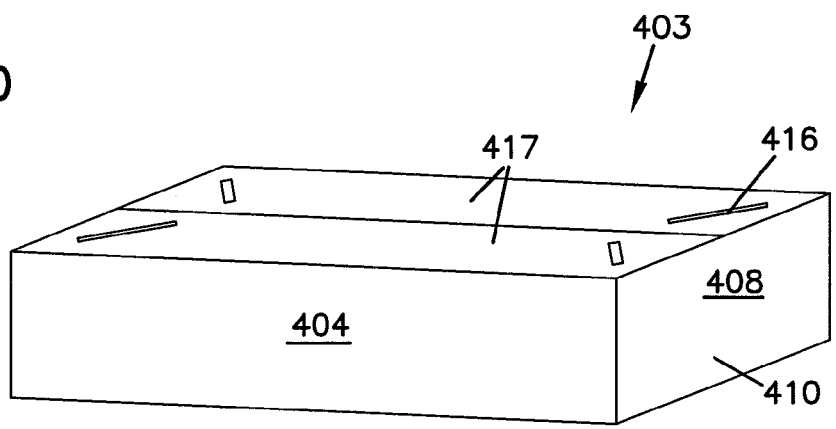
FIG. 10 is a rear perspective view of the second payout arrangement of FIG. 9.

Referring now to FIGS. 9-13, a length of telecommunications cable 210 can be arranged on a second payout arrangement 400 to enable access to both the first end 212 and the second end 214 of the cable 210. The second payout arrangement 400 includes a container 410 having a top side 401 (FIG. 9) and a bottom side 403 (FIG. 10). In one embodiment, the container 410 is formed from cardboard or paperboard. In other embodiments, however, the container 410 can be formed from any desired material.

The container 410 includes opposing side panels 402, 404 and opposing ends panels 406, 408 extending between the side panels 402, 404. The side panels 402, 404 and end panels 406, 408 define an interior 415 (FIG. 9). The top side 401 of the container 410 includes cover panels 411 hingedly coupled to the side panels 402, 404 of the container 410. Tab panels 413 are hingedly coupled to the end panels 406, 408 of the container 410. The cover panels 411 and tab panels 413 can pivot between an open position (FIG. 9) in which the interior 415 can be accessed through the top side 401 of the container 410 and a closed position (not shown).

The bottom side 403 of the container 410 is generally a mirror-image of the top side 401. The bottom side 403 includes cover panels 417 hingedly coupled to the side panels 402, 404 and tab panels (not shown) hingedly coupled to the end panels 406, 408 of the container 410. By first flipping the container 410 upside-down, the cover panels 417 and tab panels can be pivoted between an open position (not shown) in which the interior 415 can be accessed through the bottom side 403 of the container 410 and a closed position (FIG. 10). Typically, when the cover panels 417 and tab panels on the bottom side 403 are open, the cover panels 411, 413 on the top side 401 are closed and vice versa.

In general, the interior 415 is configured to retain a telecommunications cable 210 wound in one of multiple cable arrangements. In the example shown in FIG. 11, the cable 210 can be arranged in a "continuous figure 8" arrangement 270. This arrangement 270 lays the first end 212 of the cable 210 along the top side 401 of the container 410 and continuously wraps the cable 210 in a "figure 8" pattern. The second end 214 of the cable 210 finishes at the bottom side 403 of the container 410. The first end 212, therefore, is accessible from the top side 401 of the container 410 and the second end 214 is accessible from the bottom side 403.

Figure 8:
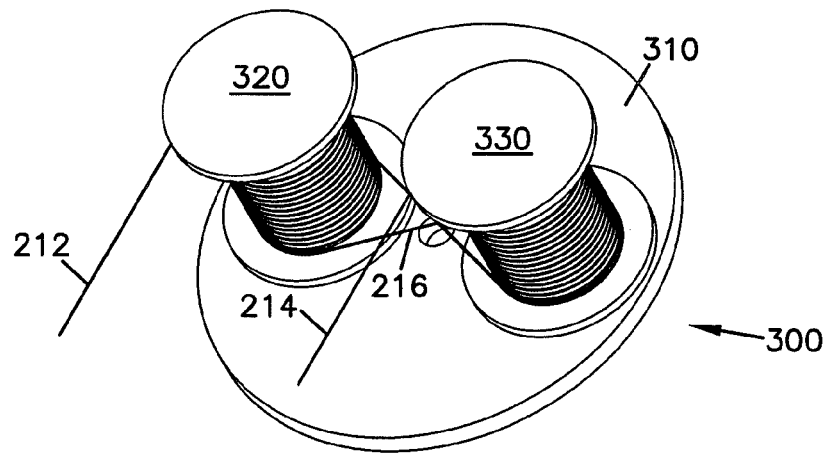
FIG. 8 is a perspective view of a length of telecommunications cable wrapped in the second cable arrangement on the first payout arrangement of FIG. 2.
Figure 11:
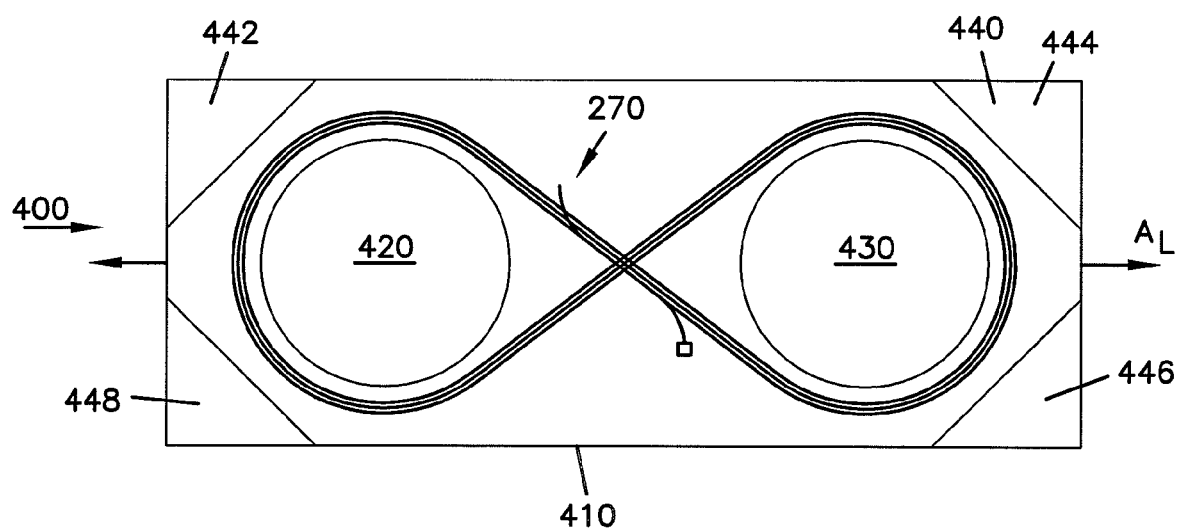
FIG. 11 is a schematic diagram illustrating one example cable arrangement for a length of telecommunications cable arranged within the second payout arrangement of FIG. 9.

This arrangement 270 differs from the cable arrangement 260 shown in FIG. 8. In cable arrangement 260, only the intermediate section 216 forms a "figure 8" pattern. The first end 212 of the cable 210 is wrapped in a coil around the first spool member 320 and the second end 224 of the cable 210 is wrapped in a coil around the second spool member 330 (e.g., see FIG. 8). In contrast, in cable arrangement 270, the entire cable is wound in the "figure 8" pattern. In one embodiment, a zip-tie or other fastener can secure the cable 210 in the desired arrangement.

In certain embodiments, the interior 415 is configured to hold first and second guides 420, 430 (FIG. 9) to aid in creating and maintaining the cable 210 in the cable arrangements, such as cable arrangement 270. The first and second guides 420, 430 extend from the top side 401 to the bottom side 403 of the interior 415 of the container 410. The first and second guides 420, 430 are generally aligned and spaced from one another along a longitudinal axis $A_L$ (FIG. 11) of the container 410.

In some embodiments, the first and second guides 420, 430 are generally cylindrical. In other embodiments, however, the guides 420, 430 can be any desired shape. The guides 420, 430 can be fixedly mounted within the container 410. For example, in one embodiment, adhesive can be applied to either side of the guides 420, 430 to affix the guides 420, 430 to the tab panels 413 on either side 401, 403 of the container 410. Typically, the adhesive has sufficient strength to enable a user to pull the tab panels 413 on one side 401, 403 away from the guides 420, 430 and into an open position (FIG. 9) without damaging the tab panels 413 or the guides 420, 430. In other embodiments, the guides 420, 430 are not secured to the container or the container 410 does not include guides 420, 430.

In some embodiments, the container 410 also includes one or more outer guides 440. In a preferred embodiment, the container 410 holds an outer guide 442, 444, 446, 448 in each corner, respectively, of the container 410. The outer guides 440 facilitate routing and inhibit tangling of the cable 210. The outer guides 440 can also aid in maintaining the shape of the cable arrangement into which the cable 210 is arranged. In some embodiments, the outer guides 440 include foam inserts. In other embodiments, however, the outer guides 440 can be formed from any desired material or monolithically formed with the container 410.

Figure 12:
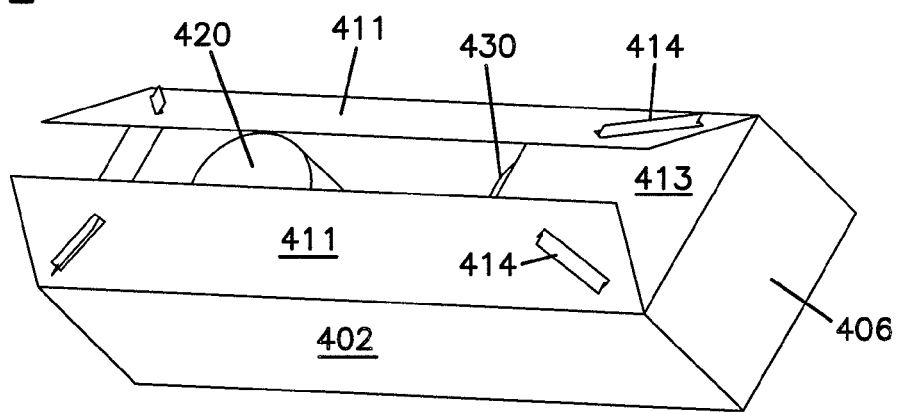
FIG. 12 is a front perspective view of the second payout arrangement of FIG. 9 arranged in a deployment position.
Figure 13:
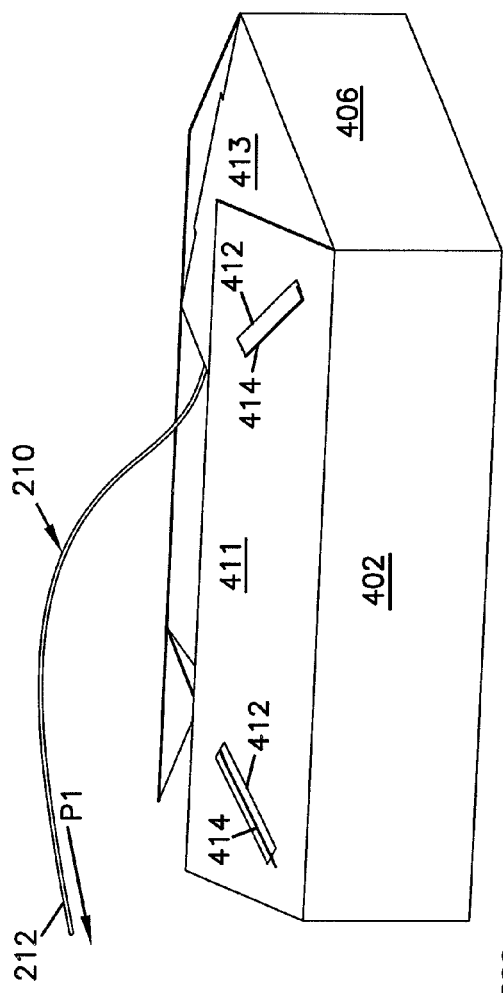
FIG. 13 is a front perspective view of a length of telecommunications cable being unwound from the second payout arrangement of FIG. 9 along a pull direction.
Figure 15:
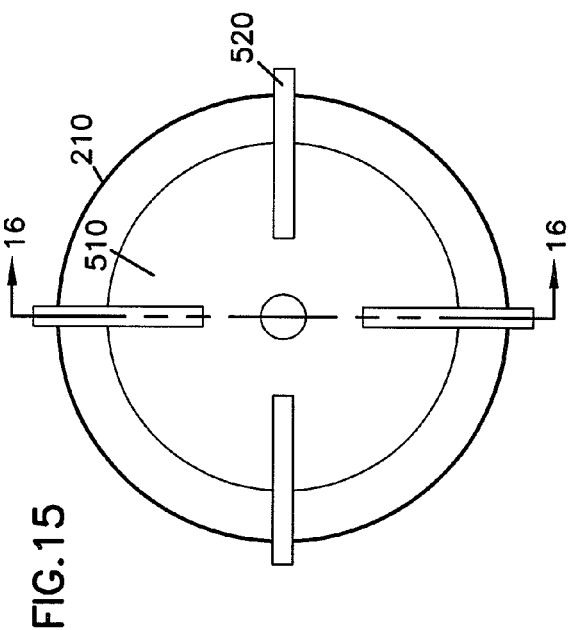
FIG. 15 is a front view of the third payout arrangement of FIG. 14.

Referring to FIGS. 12-13, in use, the cable 210 can be accessed from either the top side 401 or the bottom side 403 of the container 410, depending on which end 212, 214 of the cable 210 a user desires to access in a given application. First, the container 410 is oriented so the appropriate side 401, 403 is accessible and then the appropriate side 401, 403 is arranged in a deployment position (e.g., see FIG. 12). If a fastener, such as a zip-tie, is coupled to the cable 210 to maintain the cable 210 in a cable arrangement, such as cable arrangement 270, then the fastener can be removed either before or after arranging the container 410 in the deployment position.

In the deployment position, the tab panels are positioned at an angle between the cover panels and the rest of the container 410. The cover panels and the tab panels are coupled together to form a generally funnel-shaped opening through which the cable 210 can pass. In some embodiments, the cover panels and the tab panels can be interlocked together. For example, as shown in FIGS. 12 and 13, tabs 414 on tab panels 413 can be bent towards cover panels 411 and slid into slots 412 defined in the cover panels 411. The tabs 414 are configured to remain in the slots 412 even against the force of the cable 210 being unwound and being pulled out from the container 410. In other embodiments, the cover panels can be otherwise affixed or fastened to the tab panels.

When configured in the deployment position, the cover panels are angled between the open position and the closed position to form a slit through which the interior 415 of the container 410 can be accessed (e.g., see FIGS. 12 and 13). Typically, the slit has a width extending between the two cover panels 411 of about two to about seven inches. In a preferred embodiment, the slit has a width of about four to about five inches. Configuring the container 410 into the deployment position helps to control the egress of the cable 210 from the container 410 and to inhibit tangling of the cable 210. For example, the cover panels 411 and tab panels 413 define a limited space or slot through which the cable 210 can exit the container 410 (see FIG. 12).

The desired end 212, 214 of the cable 210 can be pulled out of the container 410 through the slot along a pull direction P1 after the container 410 has been arranged in the deployment position (e.g., see FIG. 13). The pull direction P1 extends generally away from the container 410. As the cable 210 is pulled, the cable 210 unwinds from the container 410. In some embodiments, the cable 210 also unwinds from the guides 420, 430.

Figure 14:
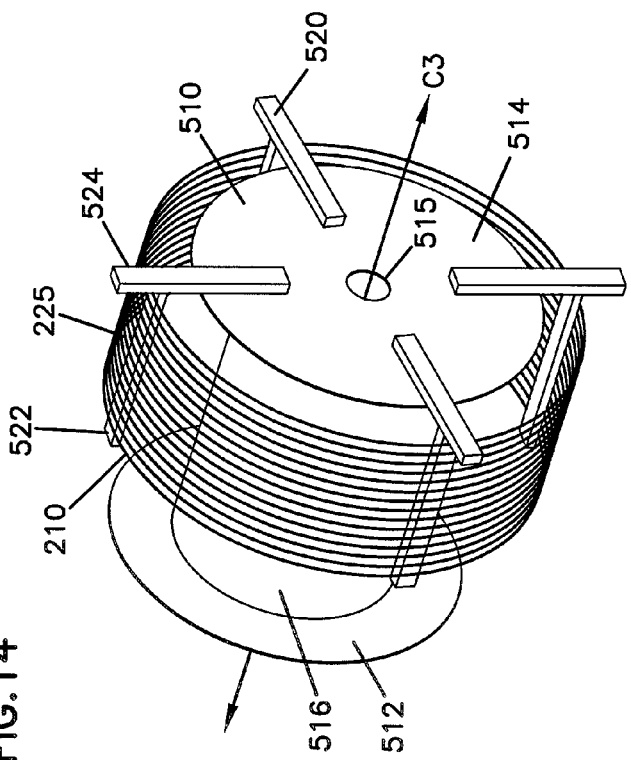
FIG. 14 is a front perspective view of a third payout arrangement having features that are examples of inventive aspects in accordance with the principles of the present disclosure.

Referring now to FIGS. 14-22, a third example of a payout arrangement 500, which has features that are examples of inventive aspects in accordance with the principles of the present disclosure, is shown. As shown in FIG. 14, the third payout arrangement 500 includes a spool 510 having a middle section 516 extending longitudinally from a first end 512 to a second end 514. The spool 510 defines a passage 515 extending longitudinally through the spool 510 along a central axis C3. The spool 510 can be rotatably mounted on a rod 550 (see FIG. 20) by sliding a rod 550 through the passage 515.

In certain embodiments, at least one spacer 520 is removably coupled to the spool 510. In the example shown, four spacers 520 are coupled to the spool 510 at equidistant points. Each spacer 520 has an extension member 522 and a coupling member 524. Typically, the coupling member 524 mounts to the end 514 of the spool 510. For example, the coupling member 524 can mount to the end 514 using fasteners, such as screws. In other embodiments, however, the coupling member 524 can be secured to the spool 510 by any desired attachment techniques or by the telecommunications cable 210 itself.

Figure 17:
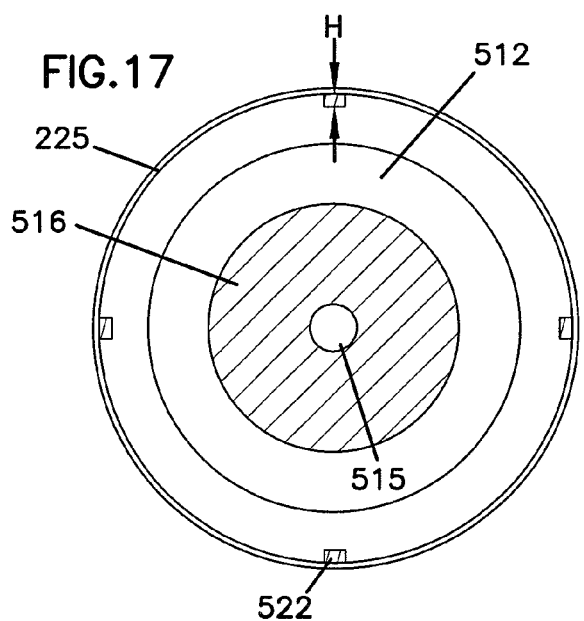
FIG. 17 is a cross-sectional view taken along the 17-17 line of FIG. 16.
Figure 18:
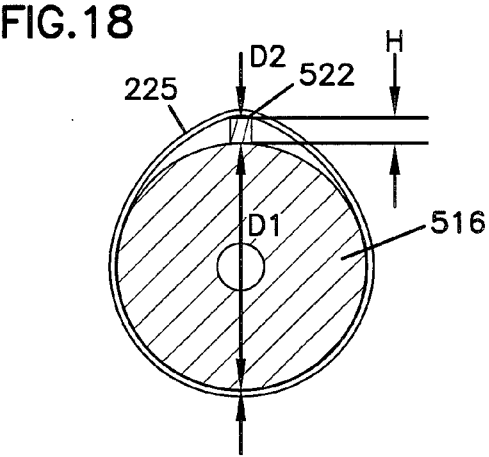
FIG. 18 is a cross-sectional view that would result if the payout arrangement of FIG. 17 had only one spacer instead of four.
Figure 19:
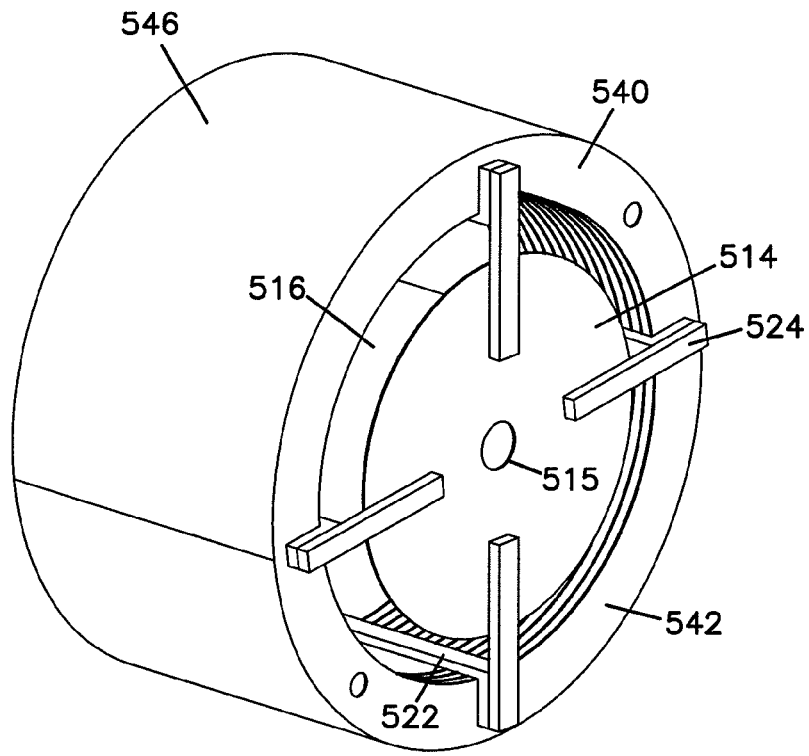
FIG. 19 is a perspective view of the third payout arrangement of FIG. 14 and a housing.
Figure 20:
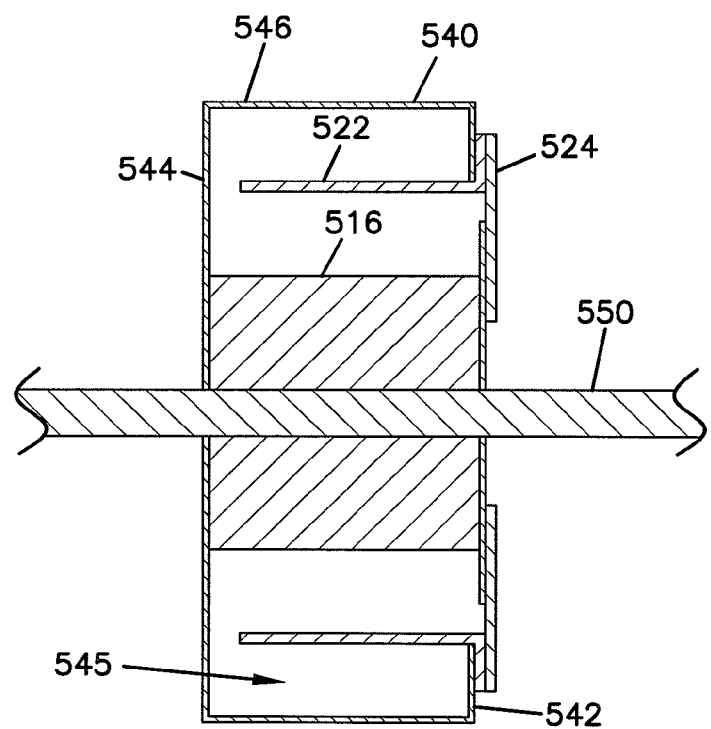
FIG. 20 is a cross-sectional view taken along the 20-20 line of FIG. 19.

The extension member 522 protrudes longitudinally along the spool 510 from the coupling member 524 (e.g., see FIG. 17). In general, the spacers 520 are configured to enable a length of telecommunications cable 210 to be wrapped in a coil 225 around the middle section 516 of the spool 510 and/or the extension members 522. In the embodiment shown in FIG. 17, the coil 225 wraps around four spacers 520 and does not contact the spool 510. In other embodiments, however, the coil 225 can wrap around the middle section 516 of the spool 510 and one or more spacers 520 (e.g., see FIG. 18).

Figure 16:
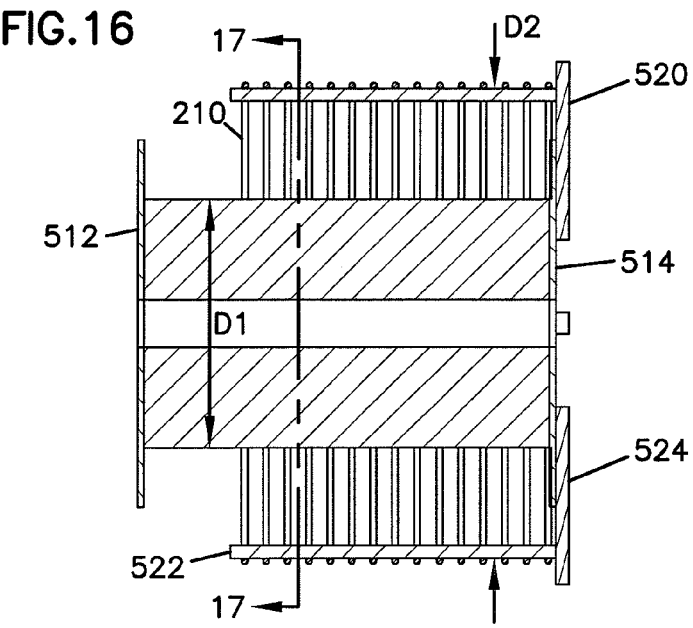
FIG. 16 is a cross-sectional view taken along the 16-16 line of FIG. 15.

The middle section 516 of the spool 510 has a diameter D1 (FIG. 16). Each spacer 520 has a height H (FIG. 17). The coil 225, therefore, has an inner diameter D2 greater than the spool diameter D1 at least by the value of H (e.g., see FIG. 18). In general, the height H of the spacers 520 ranges from about an $1/8^{th}$ of an inch to about two inches. In a preferred embodiment, the height of the spacers are about ½ of an inch. In certain embodiments, the extension members 522 of the spacers 520 can be spaced a distance D3 from the middle section 516 (e.g., see FIG. 16). Spacing the extension members 522 further increases the inner diameter D2 of the coil 225.

In use, the spacers 520 can be removed from the spool 510 to enable the cable 210 to be unwound from either end 212, 214. After the spacers 520 have been removed, the coil 225 retains the inner diameter D2 that is greater than the diameter D1 of the spool 510. The inner end 212, 214 of the cable 210 is accessible by reaching into the center of the coil 225, and grabbing and pulling the end 212, 214 out from the coil 225. The outer end 212, 214 is accessible from the outside of the coil 225. In certain embodiments, the spool 510 spins when either of the two ends 212, 214 of the cable 210 is pulled.

Referring to FIGS. 19-22, the payout arrangement 500 can include a housing 540. The housing includes a front panel 542 spaced from a rear panel 544. A side panel 546 extends between the front and rear panels 542, 544. In some embodiments, the front and rear panel 542, 544 are generally circular and the side panel 546 forms a continuous curve. In other embodiments, however, the housing 540 can be any desired shape.

Figure 21:
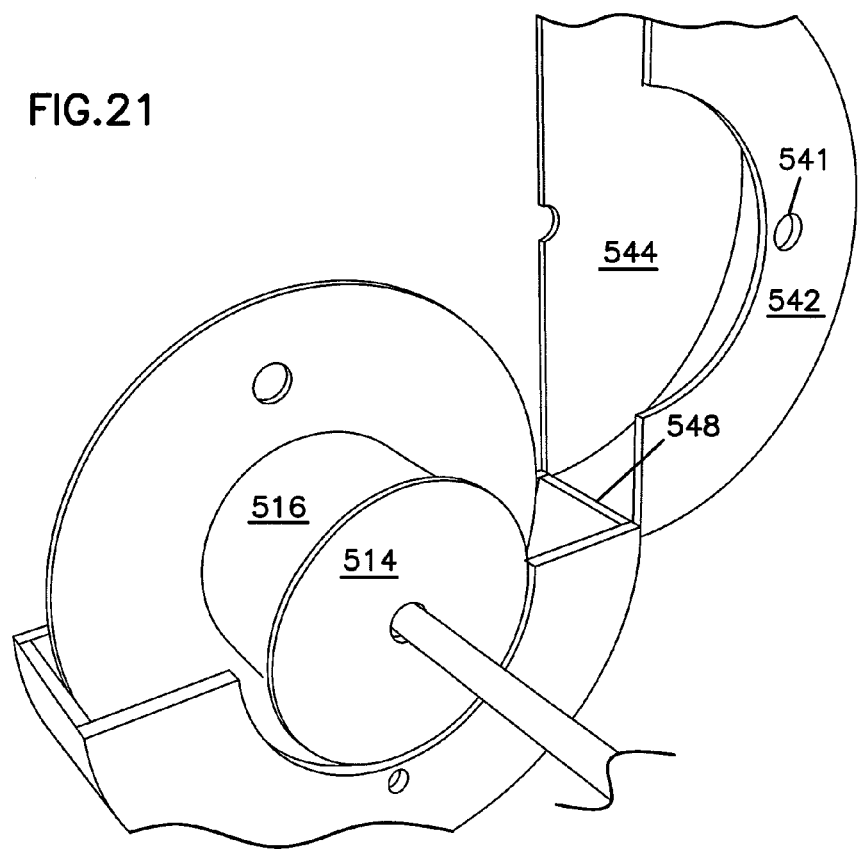
FIG. 21 is a perspective view of the third payout arrangement and housing of FIG. 19 showing the housing in an open position.
Figure 22:
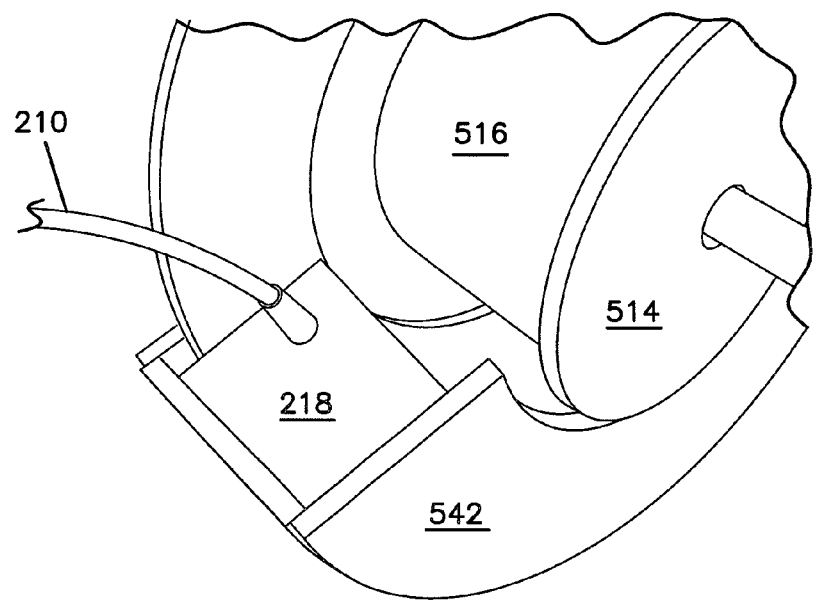
FIG. 22 is a partial view of a cable drop terminal being position within the housing of the third payout arrangement of FIG. 21.

In certain embodiments, the housing 540 is configured to pivot from a closed position (FIG. 19) to an open position (FIG. 21). For example, as shown in FIG. 21, a hinge 548 can be coupled to the side wall 546 to enable a portion of the front, rear, and side panels 542, 544, 546 to pivot about the hinge 548. Pivoting the housing 540 into an open position facilitates access to the interior 545 of the housing 540.

In general, the interior 545 includes a ring of space in which the cable 210 can be located when coiled around the spool 510 and/or spacers 520. In some embodiments, the interior 545 is sufficiently large to accommodate one or more connectors or connector terminals at one of the ends 212, 214 of the cable 210 (e.g., see FIG. 22).

In some embodiments, the front panel 542 of the housing 540 defines one or more openings 541 through which one end 212, 214 of the cable 210 can be inserted. In a preferred embodiment, at least two openings 541 are spaced approximately equidistant apart along the front panel 542. Sliding one end 212, 214 of the cable 210 through the hole 541 facilitates locating the end 212, 214 during deployment and inhibits unwinding of the coil 225 during storage or shipping of the payout arrangement 500 to the installation site.

From the forgoing detailed description, it will be evident that modifications and variations can be made in the devices of the disclosure without departing from the spirit or scope of the disclosure. For example, while some of the embodiments described above have been discussed in terms of fiber optic cable systems, persons having skill in the art will note the teachings of this disclosure are equally applicable to copper or other types of telecommunications cable systems.

We claim:

1. A method for storing a telecommunications cable, the method comprising:
   providing a spool extending longitudinally from a first end flange to a second end flange, the spool being configured to rotate about a central axis, the spool having a diameter;
   providing at least one spacer having a first portion and a second portion, the first portion extending longitudinally along the spool;
   attaching the second portion of each spacer to the first end flange of the spool so that first portion of each spacer is radially spaced from the spool;
   winding a length of cable, which has a first end and a second end, around the spool and the first portion of each spacer to form a coil, the coil having an inner diameter greater than the diameter of the spool;
   selecting one of the first and second ends of the length of cable for access; and
   accessing the selected end of the length of cable.

2. The method of claim 1, wherein selecting one of the ends of the length of cable for access comprises selecting the first end; and wherein accessing the selected end of the length of cable comprises accessing the first end.

3. The method of claim 2, wherein the first end of the length of cable is located at an inner portion of the coil.

4. The method of claim 3, wherein accessing the first end of the length of cable comprises reaching into a gap provided between an interior of the coil and an exterior of the spool to access the first end of the length of cable.

5. The method of claim 1, wherein winding the length of cable around the spool and the at least one spacer to form the coil comprises winding the length of cable around the spool and at least four spacers to form the coil.

6. The method of claim 1, further comprising removing the spacer before accessing the selected end of the length of cable.

7. The method of claim 1, wherein providing at least one spacer comprises providing a plurality of spacers and wherein attaching the second portion of each spacer to the first end flange of the spool comprises attaching the second portions of the plurality of spacers to the first end flange so that the spacers are disposed circumferentially about the spool and spaced from each other.

8. The method of claim 1, wherein winding the length of cable around the spool and the at least one spacer to form a coil comprises winding the length of cable so that the coil does not contact the spool.

* * * * *